US012308550B2

(12) United States Patent
Pavlovic et al.

(10) Patent No.: US 12,308,550 B2
(45) **Date of Patent: *May 20, 2025**

(54) SPRING-ACTUATED ELECTRICAL CONNECTOR FOR HIGH-POWER APPLICATIONS

(71) Applicant: Eaton Intelligent Power Limited, Dublin (IE)

(72) Inventors: Slobodan Pavlovic, Novi, MI (US); Mohamad Zeidan, Bloomfield Hills, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,380

(22) Filed: Nov. 6, 2023

(65) Prior Publication Data

US 2024/0347951 A1 Oct. 17, 2024

Related U.S. Application Data

(63) Continuation of application No. 17/570,740, filed on Jan. 7, 2022, now Pat. No. 11,870,175, which is a (Continued)

(51) Int. Cl.
*H01R 13/187* (2006.01)
*H01R 4/48* (2006.01)
(Continued)

(52) U.S. Cl.
CPC ............. *H01R 13/187* (2013.01); *H01R 4/48* (2013.01); *H01R 13/03* (2013.01); *H01R 13/18* (2013.01)

(58) Field of Classification Search
CPC ...... H01R 13/187; H01R 13/03; H01R 13/18; H01R 4/48
(Continued)

(56) References Cited

U.S. PATENT DOCUMENTS 4,040,713 A 8/1977 Konnemann
4,201,438 A 5/1980 Shea
(Continued)

FOREIGN PATENT DOCUMENTS

CN 1722537 1/2006
CN 102714369 10/2012
(Continued)

OTHER PUBLICATIONS

International Search Report and Written Opinion issued in PCT/US2019/036010, dated Sep. 30, 2019, 13 pages.
(Continued)

*Primary Examiner* — Peter G Leigh
(74) *Attorney, Agent, or Firm* — Meunier Carlin & Curfman LLC

(57) ABSTRACT

The present invention provides an electrical connector assembly for use in a high-power application, such as with motor vehicle electronics, that exposes the connector assembly to elevated temperatures and thermal cycling. The connector assembly includes a first electrically conductive connector formed from a first material, an internal spring member formed from a second material residing within the first connector, and a second electrically conductive connector with a receptacle dimensioned to receive both the first connector and the spring member to define a connected position, wherein the connector assembly withstands the elevated temperatures and thermal cycling resulting from the high-power application. To maintain the first and second connectors in the connected position, the spring arm of the spring member exerts an outwardly directed force on the contact beam of the first connector to outwardly displace the contact beam into engagement with an inner surface of the receptacle of the second connector.

19 Claims, 12 Drawing Sheets

Related U.S. Application Data continuation of application No. 16/908,646, filed on Jun. 22, 2020, now Pat. No. 11,223,150, which is a continuation of application No. 16/194,891, filed on Nov. 19, 2018, now Pat. No. 10,693,252, which is a continuation of application No. 15/905,806, filed on Feb. 26, 2018, now Pat. No. 10,135,168, which is a continuation of application No. 15/283,242, filed on Sep. 30, 2016, now Pat. No. 9,905,953.

(51) Int. Cl.
*H01R 13/03* (2006.01)
*H01R 13/18* (2006.01)

(58) Field of Classification Search
USPC .......................................................... 439/839
See application file for complete search history.

(56) References Cited

U.S. PATENT DOCUMENTS 4,416,504 A 11/1983 Sochor
4,534,610 A 8/1985 Takihara
4,540,235 A 9/1985 Lolic
4,583,812 A 4/1986 Gross et al.
4,593,464 A 6/1986 Williams et al.
4,632,483 A 12/1986 Verin
4,713,018 A 12/1987 Sutton
4,895,531 A * 1/1990 Vignoli .................. H01R 13/18 439/404
4,902,244 A 2/1990 Endo et al.
4,932,877 A * 6/1990 Zinn ...................... H01R 13/18 D13/133
4,938,720 A * 7/1990 Romak .................. H01R 13/18 439/745
4,975,066 A 12/1990 Sucheski et al.
4,983,127 A 1/1991 Kawai et al.
5,007,865 A 4/1991 Jakobeit
5,035,661 A 7/1991 Steinhardt et al.
5,042,433 A 8/1991 Monnier
5,062,918 A 11/1991 Zodrow
5,094,636 A 3/1992 Zinn et al.
5,102,752 A 4/1992 Hope et al.
5,120,255 A 6/1992 Kouda et al.
5,162,004 A 11/1992 Kuzuno et al.
5,169,336 A 12/1992 Taguchi
5,188,545 A 2/1993 Hass et al.
5,240,439 A 8/1993 Egenolf
5,273,766 A 12/1993 Long
5,288,252 A 2/1994 Steinhardt et al.
5,295,873 A 3/1994 Walbrecht
5,334,058 A 8/1994 Hotea
5,338,229 A 8/1994 Egenolf
5,361,377 A 11/1994 Miller
5,362,262 A 11/1994 Hotea
5,391,097 A 2/1995 Kerul
5,415,571 A 5/1995 Lutsch
5,419,723 A 5/1995 Villiers et al.
5,437,566 A 8/1995 Zinn et al.
5,486,123 A 1/1996 Miyazaki
5,536,184 A 7/1996 Wright et al.
5,551,897 A 9/1996 Alwine
5,562,506 A 10/1996 Wright
5,573,434 A 11/1996 Ittah et al.
5,607,328 A * 3/1997 Joly ...................... H01R 13/11 439/852
5,624,283 A 4/1997 Hotea
5,664,972 A * 9/1997 Zinn .................... H01R 13/113 439/852
5,716,245 A 2/1998 Kameyama et al.
5,810,627 A 9/1998 Gierut et al.
5,827,094 A 10/1998 Aizawa et al.
5,863,225 A 1/1999 Liebich et al.
5,868,590 A 2/1999 Dobbelaere
5,938,485 A 8/1999 Hotea et al.
5,941,740 A * 8/1999 Neuer .................. H01R 13/113 439/852
5,951,338 A 9/1999 Seko et al.
5,954,548 A * 9/1999 Stabroth .............. H01R 13/434 439/748
5,975,964 A 11/1999 Seko et al.
5,980,336 A 11/1999 Hall et al.
6,042,433 A 3/2000 Chen
6,062,918 A 5/2000 Myer et al.
6,102,752 A 8/2000 Bommel et al.
6,126,495 A 10/2000 Lolic et al.
6,186,840 B1 2/2001 Geltach et al.
6,257,931 B1 7/2001 Sakurai et al.
6,261,116 B1 7/2001 Ceru
6,273,766 B1 8/2001 Zennamo, Jr. et al.
6,361,377 B1 3/2002 Saka et al.
6,371,813 B2 4/2002 Ramey et al.
6,390,830 B1 5/2002 Onizuka
6,394,858 B1 5/2002 Geltsch et al.
6,402,571 B1 6/2002 Muller et al.
6,475,040 B1 11/2002 Myer et al.
6,514,098 B2 2/2003 Marpoe et al.
6,561,841 B2 5/2003 Norwood et al.
6,565,396 B2 5/2003 Saka et al.
6,679,736 B2 1/2004 Saka
6,695,644 B2 2/2004 Zhao et al.
6,722,926 B2 4/2004 Chevassus-More
6,761,577 B1 7/2004 Koehler
6,814,625 B2 11/2004 Richmond et al.
6,824,170 B2 11/2004 Lee
6,872,103 B1 3/2005 Flieger et al.
6,921,283 B2 7/2005 Zahlit et al.
6,928,705 B2 * 8/2005 Osterland ............... F16B 5/065 24/295
6,966,796 B2 * 11/2005 Abe ....................... H01R 24/40 439/585
6,994,600 B2 2/2006 Coulon
7,014,515 B2 3/2006 Lutsch et al.
7,120,971 B2 * 10/2006 Osterland ............... B60R 13/04 24/295
7,134,170 B2 * 11/2006 Gibbons ................. F16B 5/065 24/295
7,150,660 B2 12/2006 Allgood et al.
7,175,488 B2 2/2007 Pavlovic et al.
7,192,318 B2 3/2007 Hotea et al.
7,278,891 B2 10/2007 Cvasa et al.
7,287,945 B2 * 10/2007 Lubera .................. F16B 5/0664 24/295
7,300,319 B2 11/2007 Lutsch et al.
7,314,377 B2 1/2008 Northey et al.
7,329,132 B1 2/2008 Kamath et al.
7,329,158 B1 2/2008 Roberts et al.
7,338,305 B2 3/2008 Norwood et al.
7,491,100 B2 2/2009 Johannes et al.
7,494,352 B2 2/2009 Furio et al.
7,497,723 B2 3/2009 Brassell et al.
7,503,776 B1 3/2009 Pavlovic et al.
7,520,773 B2 4/2009 Siebens et al.
7,563,133 B2 7/2009 Stein
7,568,921 B2 8/2009 Pavlovic et al.
7,595,715 B2 9/2009 Pavlovic et al.
7,613,003 B2 11/2009 Pavlovic et al.
7,647,954 B2 1/2010 Garber et al.
7,651,344 B2 1/2010 Wu
7,682,180 B2 3/2010 Brown et al.
7,713,096 B2 5/2010 Pavlovic et al.
7,725,991 B2 * 6/2010 Lubera .................... F16B 5/065 24/295
7,758,369 B2 7/2010 Miller et al.
7,766,706 B2 8/2010 Kawamura et al.
7,780,489 B2 8/2010 Stuklek
7,794,257 B2 * 9/2010 Rozet ..................... H01R 13/28 439/290
7,837,519 B2 11/2010 Copper et al.
7,876,193 B2 1/2011 Pavlovic et al.
7,892,050 B2 * 2/2011 Pavlovic ............. H01R 13/112 439/857

(56) References Cited

U.S. PATENT DOCUMENTS

| | | | | |
|---|---|---|---|---|
| 7,927,127 | B1 | 4/2011 | Glick et al. | |
| 7,942,682 | B2 * | 5/2011 | Copper | H01R 13/187 439/571 |
| 7,942,683 | B2 * | 5/2011 | Copper | H01R 13/187 439/187 |
| 7,963,782 | B2 | 6/2011 | Hughes | |
| 7,976,351 | B2 | 7/2011 | Boemmel et al. | |
| 7,988,505 | B2 | 8/2011 | Hotea et al. | |
| 8,111,052 | B2 | 2/2012 | Glovinski | |
| 8,128,426 | B2 | 3/2012 | Glick et al. | |
| 8,167,337 | B2 | 5/2012 | Bruno et al. | |
| 8,202,124 | B1 | 6/2012 | Natter et al. | |
| 8,206,175 | B2 | 6/2012 | Boyd et al. | |
| 8,235,292 | B2 | 8/2012 | Talboys | |
| 8,242,874 | B2 | 8/2012 | Pavlovic et al. | |
| 8,277,243 | B1 | 10/2012 | Hernandez et al. | |
| 8,282,429 | B2 | 10/2012 | Glick et al. | |
| 8,366,497 | B2 | 2/2013 | Glick et al. | |
| 8,388,389 | B2 | 3/2013 | Costello et al. | |
| 8,430,689 | B2 | 4/2013 | Myer et al. | |
| 8,446,733 | B2 | 5/2013 | Hampo et al. | |
| 8,449,338 | B2 * | 5/2013 | Gong | H01R 13/18 439/682 |
| 8,475,220 | B2 | 7/2013 | Glick et al. | |
| 8,651,892 | B2 | 2/2014 | Arant | |
| 8,662,935 | B2 | 3/2014 | Jouas et al. | |
| 8,668,506 | B2 | 3/2014 | Stack et al. | |
| 8,678,867 | B2 * | 3/2014 | Glick | H01R 13/111 439/843 |
| 8,758,043 | B2 | 6/2014 | Ohyama | |
| 8,795,007 | B2 | 8/2014 | Iihoshi et al. | |
| 8,840,436 | B2 | 9/2014 | Mott et al. | |
| 8,858,264 | B2 | 10/2014 | Mott et al. | |
| 8,858,274 | B2 | 10/2014 | Jelak et al. | |
| 8,941,731 | B2 | 1/2015 | Barba | |
| 8,944,844 | B2 | 2/2015 | Myer | |
| 8,956,190 | B2 | 2/2015 | Pavlovic et al. | |
| 8,968,021 | B1 | 3/2015 | Okuda et al. | |
| 8,974,244 | B2 | 3/2015 | Aihara | |
| 8,992,270 | B2 | 3/2015 | Glick et al. | |
| 8,998,655 | B2 | 4/2015 | Pavlovic et al. | |
| 9,011,186 | B2 | 4/2015 | Wirth et al. | |
| 9,048,552 | B2 | 6/2015 | Eyles et al. | |
| 9,059,542 | B2 | 6/2015 | Oh et al. | |
| 9,077,114 | B2 | 7/2015 | Oh et al. | |
| 9,142,902 | B2 | 9/2015 | Pavlovic et al. | |
| 9,166,322 | B2 | 10/2015 | Glick et al. | |
| 9,190,756 | B2 | 11/2015 | Glick et al. | |
| 9,225,116 | B2 | 12/2015 | Mckibben | |
| 9,236,682 | B2 | 1/2016 | Glick et al. | |
| 9,257,804 | B1 | 2/2016 | Beck et al. | |
| 9,293,852 | B2 | 3/2016 | Glick et al. | |
| 9,300,069 | B2 * | 3/2016 | Morello | H01R 13/18 |
| 9,353,894 | B2 | 5/2016 | Richards et al. | |
| 9,356,394 | B2 | 5/2016 | Kennedy et al. | |
| 9,368,904 | B2 | 6/2016 | Pavlovic et al. | |
| 9,379,470 | B2 | 6/2016 | Glick et al. | |
| 9,431,740 | B2 | 8/2016 | Glick et al. | |
| 9,437,974 | B2 * | 9/2016 | Glick | H01R 13/642 |
| 9,444,168 | B2 | 9/2016 | Horiuchi et al. | |
| 9,444,205 | B2 * | 9/2016 | Rangi | H01R 24/86 |
| 9,455,516 | B2 | 9/2016 | Gutenschwager et al. | |
| 9,502,783 | B2 | 11/2016 | Bleicher et al. | |
| 9,525,254 | B2 | 12/2016 | Chen | |
| 9,537,241 | B2 * | 1/2017 | Rivera | H01R 13/113 |
| 9,548,553 | B2 | 1/2017 | Glick et al. | |
| 9,583,860 | B1 | 2/2017 | Dewitte | |
| 9,608,369 | B1 | 3/2017 | Schroll et al. | |
| 9,620,869 | B2 | 4/2017 | Listing et al. | |
| 9,653,859 | B1 | 5/2017 | Moore et al. | |
| 9,680,256 | B1 | 6/2017 | Lane et al. | |
| 9,705,229 | B2 | 7/2017 | Itou | |
| 9,705,254 | B2 | 7/2017 | Lampert et al. | |
| 9,711,885 | B2 | 7/2017 | Hasegawa et al. | |
| 9,748,693 | B1 | 8/2017 | Exenberger et al. | |
| 9,841,454 | B2 | 12/2017 | Gelonese | |
| 9,847,591 | B2 * | 12/2017 | Glick | H01R 13/18 |
| 9,876,317 | B2 | 1/2018 | Glick et al. | |
| 9,905,950 | B2 | 2/2018 | Marsh et al. | |
| 9,905,953 | B1 | 2/2018 | Pavlovic et al. | |
| 9,905,955 | B2 | 2/2018 | Endo et al. | |
| 9,948,044 | B2 | 4/2018 | Buckhout et al. | |
| 10,014,614 | B2 | 7/2018 | York et al. | |
| 10,014,631 | B1 | 7/2018 | Chambly et al. | |
| 10,038,278 | B2 | 7/2018 | Lane et al. | |
| 10,044,140 | B1 | 8/2018 | Gianrossi et al. | |
| 10,122,117 | B2 | 11/2018 | Miller et al. | |
| 10,135,168 | B2 | 11/2018 | Pavlovic et al. | |
| 10,184,970 | B2 | 1/2019 | Maalouf | |
| 10,218,117 | B1 | 2/2019 | Probert et al. | |
| 10,276,959 | B2 | 4/2019 | Jetter et al. | |
| 10,283,889 | B2 | 5/2019 | Glick et al. | |
| 10,355,414 | B1 | 7/2019 | Alvarado | |
| 10,693,252 | B2 | 6/2020 | Pavlovic et al. | |
| 11,069,999 | B2 | 7/2021 | Porter et al. | |
| 11,223,150 | B2 | 1/2022 | Pavlovic et al. | |
| 2001/0019924 | A1 | 9/2001 | Heimueller | |
| 2001/0021602 | A1 | 9/2001 | Zanten | |
| 2002/0019156 | A1 | 2/2002 | Fukamachi et al. | |
| 2002/0049005 | A1 | 4/2002 | Leve | |
| 2002/0081888 | A1 | 6/2002 | Regnier et al. | |
| 2002/0180272 | A1 | 12/2002 | Yuasa et al. | |
| 2004/0121649 | A1 * | 6/2004 | Endo | H01R 24/40 439/578 |
| 2004/0150224 | A1 | 8/2004 | Lee | |
| 2005/0118866 | A1 * | 6/2005 | Abe | H01R 24/40 439/578 |
| 2005/0134037 | A1 | 6/2005 | Bruno et al. | |
| 2005/0211934 | A1 | 9/2005 | Garber et al. | |
| 2006/0040555 | A1 | 2/2006 | Chen et al. | |
| 2006/0172618 | A1 | 8/2006 | Yamashita et al. | |
| 2007/0123093 | A1 | 5/2007 | Lutsch et al. | |
| 2007/0149050 | A1 | 6/2007 | Oka et al. | |
| 2009/0197457 | A1 | 8/2009 | Lanni | |
| 2010/0323563 | A1 * | 12/2010 | Pavlovic | H01R 13/68 439/839 |
| 2011/0076901 | A1 * | 3/2011 | Glick | H01R 13/187 29/874 |
| 2011/0130023 | A1 | 6/2011 | Kataoka et al. | |
| 2011/0168778 | A1 | 7/2011 | Talboys | |
| 2011/0171843 | A1 | 7/2011 | Casses et al. | |
| 2012/0094551 | A1 | 4/2012 | Corman et al. | |
| 2012/0129407 | A1 | 5/2012 | Glick et al. | |
| 2012/0244756 | A1 | 9/2012 | Jouas et al. | |
| 2013/0002102 | A1 | 1/2013 | Chen et al. | |
| 2013/0004050 | A1 | 1/2013 | Wu et al. | |
| 2013/0040505 | A1 | 2/2013 | Hirakawa | |
| 2013/0078874 | A1 | 3/2013 | Itou et al. | |
| 2013/0109224 | A1 | 5/2013 | Chin et al. | |
| 2013/0210292 | A1 | 8/2013 | Schmidt et al. | |
| 2013/0215573 | A1 | 8/2013 | Wagner et al. | |
| 2013/0337702 | A1 | 12/2013 | Pavlovic et al. | |
| 2014/0087601 | A1 | 3/2014 | Glick et al. | |
| 2014/0193995 | A1 | 7/2014 | Barthelmes et al. | |
| 2014/0227915 | A1 | 8/2014 | Glick et al. | |
| 2015/0038000 | A1 | 2/2015 | Glick et al. | |
| 2015/0072207 | A1 | 3/2015 | Soleski et al. | |
| 2015/0074996 | A1 | 3/2015 | Glick et al. | |
| 2015/0079859 | A1 | 3/2015 | Glick et al. | |
| 2015/0162706 | A1 | 6/2015 | Kennedy et al. | |
| 2015/0255912 | A1 | 9/2015 | Natter et al. | |
| 2015/0255924 | A1 | 9/2015 | Glick et al. | |
| 2015/0280381 | A1 | 10/2015 | Rangi et al. | |
| 2016/0028169 | A1 | 1/2016 | Glick et al. | |
| 2016/0043505 | A1 | 2/2016 | Wu et al. | |
| 2016/0336572 | A1 | 11/2016 | Yoshida et al. | |
| 2017/0338600 | A1 | 11/2017 | Tanaka et al. | |
| 2018/0090900 | A1 | 3/2018 | Horiuchi et al. | |
| 2018/0191095 | A1 | 7/2018 | Pavlovic et al. | |
| 2018/0219305 | A1 | 8/2018 | Wavering et al. | |
| 2018/0351282 | A1 | 12/2018 | Duan et al. | |
| 2019/0052025 | A1 | 2/2019 | Buechli et al. | |
| 2019/0089083 | A1 | 3/2019 | Pavlovic et al. | |
| 2019/0372262 | A1 | 12/2019 | Christiano et al. | |

(56) References Cited

U.S. PATENT DOCUMENTS

| | | | |
|---|---|---|---|
| 2020/0395700 | A1 | 12/2020 | Zeidan et al. |
| 2021/0167538 | A1 | 6/2021 | Pavlovic et al. |
| 2022/0131299 | A1 | 4/2022 | Pavlovic et al. |

FOREIGN PATENT DOCUMENTS

| | | | | |
|---|---|---|---|---|
| CN | 103022756 | 4/2013 | | |
| CN | 103141000 | 6/2013 | | |
| CN | 203193080 | 9/2013 | | |
| CN | 104614564 | 5/2015 | | |
| CN | 2015100485492 | 5/2015 | | |
| CN | 105225040 | 1/2016 | | |
| CN | 206098831 | 4/2017 | | |
| CN | 206962160 | 2/2018 | | |
| CN | 107863610 | 3/2018 | | |
| DE | 4215162 | 12/1992 | | |
| DE | 4139100 | 1/1993 | | |
| DE | 19817924 | 10/1999 | | |
| DE | 102013211208 | 12/2014 | | |
| EP | 1291979 | 3/2003 | | |
| JP | 10-040995 | 2/1998 | | |
| JP | 10-050376 | 2/1998 | | |
| JP | 10-050377 | 2/1998 | | |
| JP | H1040995 | 2/1998 | | |
| JP | H1050376 | 2/1998 | | |
| JP | H1050377 | 2/1998 | | |
| JP | 2004200019 A | * | 7/2004 | ............. H01R 24/40 |
| JP | 2005166646 A | * | 6/2005 | ............. H01R 13/04 |
| JP | 2011049107 | 3/2011 | | |
| JP | 2012043739 | 3/2012 | | |
| JP | 2016529675 | 9/2016 | | |
| JP | 2017010755 | 1/2017 | | |
| KR | 20160138442 | 12/2016 | | |
| KR | 1020160138442 | 12/2016 | | |
| WO | WO-2015145281 A1 | * | 10/2015 | ........... H01R 13/113 |
| WO | 2017195092 | 11/2017 | | |
| WO | 2019164536 | 8/2019 | | |
| WO | 2019229587 | 12/2019 | | |
| WO | 2019236976 | 12/2019 | | |
| WO | 2019237009 | 12/2019 | | |
| WO | 2019237046 | 12/2019 | | |

OTHER PUBLICATIONS

International Search Report and Written Opinion issued in PCT/US2019/036070, dated Sep. 27, 2019, 8 pages.

International Search Report and written Opinion issued in PCT/US2019/036127, dated Oct. 4, 2019, 11 pages.

International Search Report from PCT/US2018/019787 dated Nov. 26, 2018 (3 pages).

Written Opinion from PCT/US2018/019787 dated Nov. 26, 2018 (10 pages).

International Search Report and Written Opinion issued in PCT/US2019/036010, Sep. 30, 2019, 13 pages.

International Search Report and Written Opinion issued in PCT/US2019/036070, Sep. 27, 2019, 8 pages.

International Search Report and written Opinion issued in PCT/US2019/036127, Oct. 4, 2019, 11 pages.

International Search Report from PCT/US2018/019787 issued Nov. 26, 2018 (3 pages).

Written Opinion from PCT/US2018/019787 issued Nov. 26, 2018 (10 pages).

International Search Report and Written Opinion issued in PCT/US20/14484, dated Mar. 31, 2020, 7 pages.

International Search Report and Written Opinion issued in PCT/US21/33446, dated Aug. 24, 2021, 17 pages.

International Search Report and Written Opinion issued in PCT/US21/43686, dated Dec. 23, 2021, 28 pages.

International Search Report and Written Opinion issued in PCT/US21/43788, dated Dec. 23, 2021, 23 pages.

International Search Report and Written Opinion issued in PCT/US21/47180, dated Jan. 6, 2022, 18 pages.

International Search Report and written Opinion issued in PCT/US20/013757, dated Dec. 10, 2020, 7 pages.

International Search Report and written Opinion issued in PCT/US2010/013757, dated Dec. 10, 2020, 7 pages.

International Search Report and written Opinion issued in PCT/US2020/049870, dated Dec. 10, 2020, 20 pages.

* cited by examiner

SPRING-ACTUATED ELECTRICAL CONNECTOR FOR HIGH-POWER APPLICATIONS

CROSS REFERENCE TO RELATED APPLICATIONS

The present application is a continuation of U.S. patent application Ser. No. 17/570,740, filed Jan. 7, 2022, now U.S. Pat. No. 11,870,175, which is a continuation of U.S. patent application Ser. No. 16/908,646 filed Jun. 22, 2020, now U.S. Pat. No. 11,223,150, which is a continuation of U.S. patent application Ser. No. 16/194,891 filed Nov. 19, 2018, now U.S. Pat. No. 10,693,252, which is a continuation of U.S. patent application Ser. No. 15/905,806 filed Feb. 26, 2018, now U.S. Pat. No. 10,135,168, which is a continuation of U.S. patent application Ser. No. 15/283,242 filed Sep. 30, 2016, now U.S. Pat. No. 9,905,953, the entirety of which are hereby incorporated by reference herein.

FIELD OF INVENTION

This invention relates to the classification of electrical connectors, and to one or more sub-classifications under spring actuated or resilient securing part. Specifically, this invention is a push-in electrical connector secured by an interior spring mechanism.

BACKGROUND OF INVENTION

Over the past several decades, the amount of electronics in automobiles, and other on-road and off-road vehicles such as pick-up trucks, commercial trucks, semi-trucks, motorcycles, all-terrain vehicles, and sports utility vehicles (collectively "motor vehicles"). Electronics are used to improve performance, control emissions, and provide creature comforts to the occupants and users of the motor vehicles. Motor vehicles are a challenging electrical environments due to vibration, heat, and longevity. Heat, vibration, and aging can all lead to connector failure. In fact, loose connectors, both in the assembly plant and in the field, are one of the largest failure modes for motor vehicles. Considering that just the aggregate annual accrual for warranty by all of the automotive manufacturers and their direct suppliers is estimated at between $50 billion and $150 billion, worldwide, a large failure mode in automotive is associated with a large dollar amount.

Considerable time, money, and energy has been expended to find connector solutions that meet all of the needs of the motor vehicles market. The current common practice is to use an eyelet and threaded fastener on all high-power connections. The current common practice is expensive, time-consuming, and still prone to failure.

A more appropriate, robust connector solution must be impervious to vibration and heat. In order to create a robust solution, many companies have designed variations of spring-loaded connectors, which have a feature that retains the connector in place. Such spring-actuated connectors typically have some indication to show that they are fully inserted. Sometimes, the spring-actuated feature on the connector is made from plastic. Other times, the spring-actuated feature on the connector is fabricated from spring steel. Unfortunately, although the current state of the art is an improvement over connectors using an eyelet and threaded connector, there are still far too many failures.

Part of the reason that spring-actuated connectors still fail in motor vehicle applications is because the spring element is on the periphery of the connector. By placing the spring tab on the exterior surface of the connector, connector manufacturers tried to make engagement obvious to the person assembling the part. Unfortunately, for both plastic and metal, the increased temperatures of an automotive environment make a peripheral spring prone to failure. The engine compartment of the motor vehicle can often reach temperatures approaching 100° C., with individual components of a motor vehicle engine reaching or exceeding 180° C. At 100° C., most plastics start to plasticize, reducing the retention force of the peripheral spring-actuated feature. At 100° C., the thermal expansion of the spring steel will reduce the retention force of a peripheral spring-actuated connector by a small amount. More important, with respect to spring-actuated features fabricated from spring steel is the effect of residual material memory inherent in the spring steel as the spring steel is thermally cycled. After many temperature cycles, the spring steel will begin to return to its original shape, reducing its retention force and making is susceptible to vibration. The motor vehicle market needs a connector that is low-cost, vibration-resistant, temperature-resistant, and robust.

PRIOR ART REVIEW

There is clearly a market demand for a mechanically simple, lightweight, inexpensive, vibration-resistant, temperature-resistant, and robust electrical connector. The problem is that all of these design criteria can be conflicting in current prior art. Some of the prior art has attempted to solve the problem using a peripheral spring-actuated retention feature. For example, U.S. Utility U.S. Pat. No. 8,998,655, by named inventors Glick, et. al., entitled, "Electrical terminal" ("Glick '655") teaches an electrical terminal in which the contact element is a substantially polyhedron structure, with contact beams. A spring structure, external to the contact beams, exerts force on the contact beams. This arrangement is designed to force positive connection of the contact beams with a substantially round or square terminal pin. U.S. Utility U.S. Pat. No. 8,992,270, by named inventors Glick, et. al., entitled, "Electrical terminal" ("Glick '270") teaches a variation on the Glick '655 patent.

U.S. Utility U.S. Pat. No. 8,475,220, by named inventors Glick, et. al., entitled, "Electrical terminal" ("Glick '220") teaches an electrical connector formed to have at least one pairs of opposing contact legs extending from a body portion, in which each leg extends to a contact point at which it touches the inner surface of the opposing leg contact. A spring clip can be positioned over one or more of the opposing legs to increase a compressive force. The spring clip may include an alignment feature to limit the clip from rotating and/or pitching. Glick '220 is designed to retain a largely flat or planar terminal element. U.S. Utility U.S. Pat. No. 8,366,497, by named inventors Glick, et. al., entitled, "Electrical terminal" ("Glick '497") teaches a variation of Glick '220. All of the Glick patents have the same issue: repeated thermal cycling relaxes the spring steel, reducing the overall retention force. The reduction in the spring-actuated retention force makes the connector more susceptible to wiggling loose due to vibration. Intermittent connections are also a common failure mode. A solution is needed that improves upon the concept of the spring-actuated terminal connector.

SUMMARY OF THE INVENTION

This summary is intended to disclose the present invention, a high-power, spring-actuated electrical connector device. The embodiments and descriptions are used to illustrate the invention and its utility, and are not intended to limit the invention or its use.

The present invention has a male terminal and a female connector. The female connector fits inside the male terminal, when making an electrical connection. The present invention relates to using a spring-actuator inside the female connector to force contact beams into electrical contact with the male terminal. The present invention's contribution to the art is that the male terminal element is a metallic tubular member inside which fits the female connector. The female connector has a contact element, with a plurality of contact beams. A spring actuator is nested inside the contact element. The spring actuator applies force on the contact beams, creating a positive connection and retention force.

Unlike the prior art, material memory and thermal expansion will increase, not decrease, the retention force and electrical contact of the present invention.

The male terminal has a metallic tubular member which has an inner surface, an outer surface, and a defined cross-sectional profile. The metallic tubular member is fabricated from a sheet of highly conductive copper. The highly conductive copper can be C151 or C110. One side of the sheet of highly conductive copper can be pre-plated with silver, tin, or top tin, such that the inner surface of the metallic tubular member is plated.

The female connector has a contact element and a spring actuator. The contact element has a plurality of contact beams. In the preferred embodiments, at least four contact beams are needed, so that force is exerted on the inner surface of the metallic tubular member is symmetrical. Four beams can be placed at 90° increments, meaning that each beam has one beam directly opposing it within the metallic tubular member; and two beams orthogonal to each member within the metallic tubular member. Each contact beam has a thickness, a bent-termination end, and a planar surface with a length and a width. The contact beam is connected to a contact base at the distal end from the bent-termination. In the illustrated embodiments, the contact element has an even number of beams, which are symmetrical and are evenly spaced. The contact element base cross-section can be round, square, triangular, or polygonal. The illustrated embodiments show contact elements with square and hexagonal cross-sectional profiles. The illustrated embodiments show contact elements with four and six beams.

A spring actuator is nested inside the contact element. The spring actuator has spring arms and a base. The spring arms are connected to the base at one end. The spring arms have a bent-termination end, a thickness, and a planar surface with a length and width. In the illustrated embodiments, the spring actuator has the same number of spring arms as the contact element has contact beams. In the illustrated embodiment, the spring arms can be mapped, one-to-one, with the contact beams. The spring arms are dimensioned so that the bent-termination end of the associated contact beam contacts the planar surface of the spring arm. The spring arms of the illustrated embodiments are even in number, symmetrical, and evenly spaced.

The contact element fits inside the metallic tubular member such that the contact beams contact the inner surface of the metallic tubular member. The spring arms force the contact beams into electrical connection with the metallic tubular member. The bent-termination end of the contact arm meets the planar surface of the spring arm, forcing the contact beam to form a large obtuse angle with respect to the contact element base.

In the illustrated embodiments of the present invention, although not required, the metallic tubular member has a symmetrical cross-section. The most important design criteria is that the compliance (inverse of stiffness) exerted on each beam, forcing each beam into contact with the inner surface of the metallic tubular member, be balance by the compliance of all of the other contact beam and spring-arm pairs such that the female connector is kept centered within the metallic tubular member by the force exerted by the beam/spring arm pairs.

The male terminal and female connector are both surrounded by a non-conductive shroud. For the male terminal, only the inner surface of the metallic tubular member is exposed. For the female connector, only the contact beams are exposed.

The male terminal can be connected to a busbar or other circuit. For example, in an alternator application, the metallic tubular member can be integral with the alternator busbar. The non-conductive plastic shroud would wrap the exterior of the metallic tubular member leaving the inner surface and the busbar exposed. Typically, in such an application, the busbar of the alternator is going to be interior to the alternator housing.

BRIEF DESCRIPTION OF THE DRAWINGS

The present invention is illustrated with 44 drawings on 12 sheets.

DETAILED DESCRIPTION OF THE DRAWINGS

The following descriptions are not meant to limit the invention, but rather to add to the summary of invention, and illustrate the present invention, by offering and illustrating various embodiments of the present invention, a high-power, spring-actuated electrical connector. While embodiments of the invention are illustrated and described, the embodiments herein do not represent all possible forms of the invention. Rather, the descriptions, illustrations, and embodiments are intended to teach and inform without limiting the scope of the invention.

Figure 3:
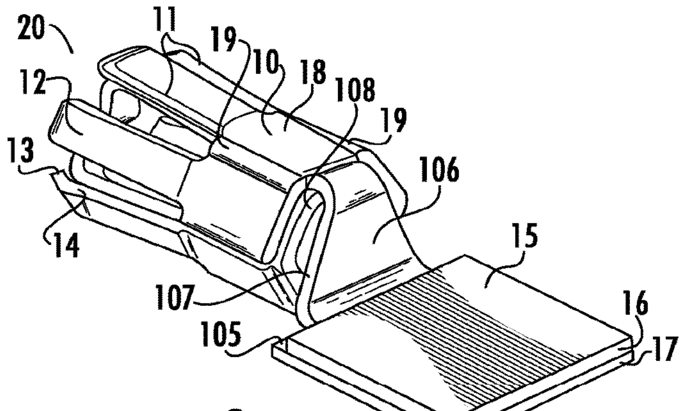
FIG. 3 is an isometric view of the female connector without a plastic shroud.
Figure 4:
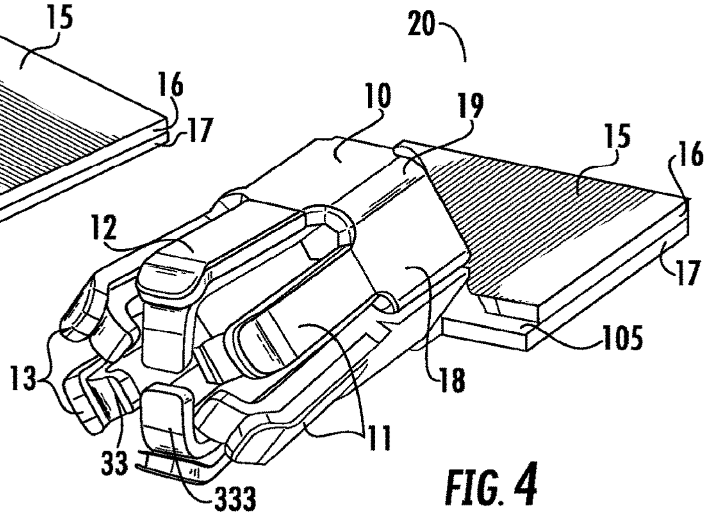
FIG. 4 is an isometric view of the female connector, rotated approximately 90° from FIG. 3.

FIGS. 3-4 show the female connector 20 of the present invention, a high-power, spring-actuated electrical connector. The female connector 20 includes a contact element 10 having a contact element 10 base 18, 19 having six sides 18 and six bent segments 19. The cross-section of the contact element 10 base is substantially hexagonal 18, 19. The contact element 10 has six contact beams 11. Each contact beam 11 has a substantially planar surface 12 terminating in a bent-termination portion 13. The end of the contact beam 11 distal from the bent-termination portion 13 is connected to the base 18. The thickness 14 and width of the planar surface 12 dictate the current carrying load of each contact beam 11. In use, the contact beams 11 form a large obtuse angle with the base 18, 19.

The contact element 10 is an integral piece. The contact element 10 is made out of conductive metal, such as copper alloys C151 or C110. It is formed, bent, and folded into the correct shape. The contact element 10 has two planar spade elements 16, 17. The planar spade elements 16, 17 have a thickness 16, 17. The planar spade elements 16, 17 have a planar surface 15, 105. The planar spade elements 16 transitions 106 from the hexagonal base 18, 19. The transition 106 has a thickness 107.

Figure 5:
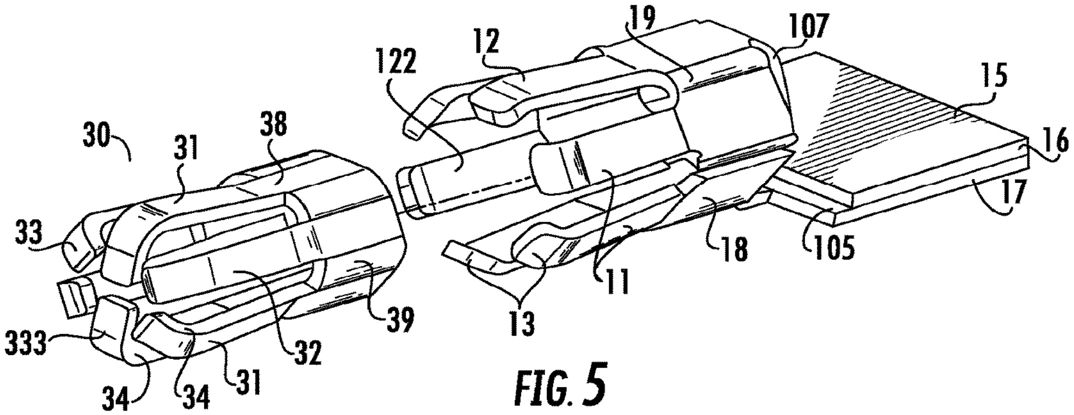
FIG. 5 is an exploded isometric of the female connector.

FIG. 5 further illustrates the female connector 20 by showing the spring actuator 30 that is inside the contact element 10. Still visible in the contact element 10 are the contact beams 11, the hexagonal base 18, 19, and the planar spade elements 16, 17. The planar surface 15, 105 and transition thickness 107 are also visible. The spring actuator 30 has a plurality of spring arms 31. The spring arms 31 have a substantially planar surface 32, a thickness 34, and a bent-termination portion 33, 333. The spring actuator 30 base is substantially hexagonal with six flat sides 38 and six bent portions 39. The spring actuator 30 is fabricated from spring steel. The spring arms 31 of the spring actuator 30 form a large obtuse angle with the spring actuator 30 base 38, 39.

The spring actuator 30 fits inside the contact element 10. The spring actuator 30 spring arms 31 contact the inside planar surface 122 of the contact element 10 contact beams 11. The inside planar surface 122 of the contact beams 11 is obverse to the outside planar surface 12 of the contact beams 11. The bent-termination portion 13 of the contact element 10 allows the female connector 20 to be compressed as it is inserted into a connector block. The spring actuator 30 spring arms 31 will provide a consistent retention force against the inside surface 122 of the contact element 10 contact beams 11. In practice, it is advisable to use a minimum of four (4) contact beams 11 in any embodiment.

Figure 6:
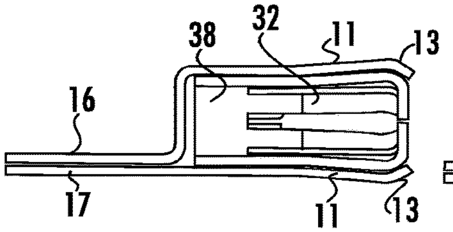
FIG. 6 is a lateral cut-away view of the female connector.
Figure 7:
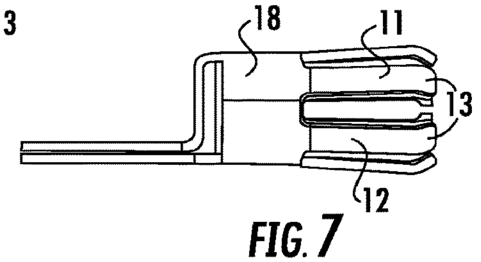
FIG. 7 is a lateral view of the female connector.

FIGS. 6-7 show a lateral cutaway (FIG. 6) and a lateral view (FIG. 7). The relation of the planar spade elements 16, 17 to the contact beams 11 and bent-termination portion 13 is illustrated and evident. The spring actuator 30 spring arm 31 flat planar surface 32 and flat side 38 are shown in the cutaway. The relation of the six sides 18 of the hexagonal base 18, 19 to the planar surface 12 of the contact beams 11 is shown.

Figure 8:
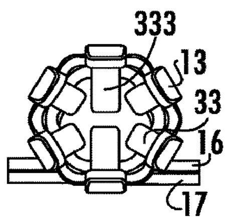
FIG. 8 is an end view of the female connector.

FIG. 8 shows an end-view of the spring actuator 30 inside the contact element 10. The bent-termination portion 333, 33 of the spring actuator 30 push the bent-termination portion 13 of the contact element 10 outward.

Figure 9:
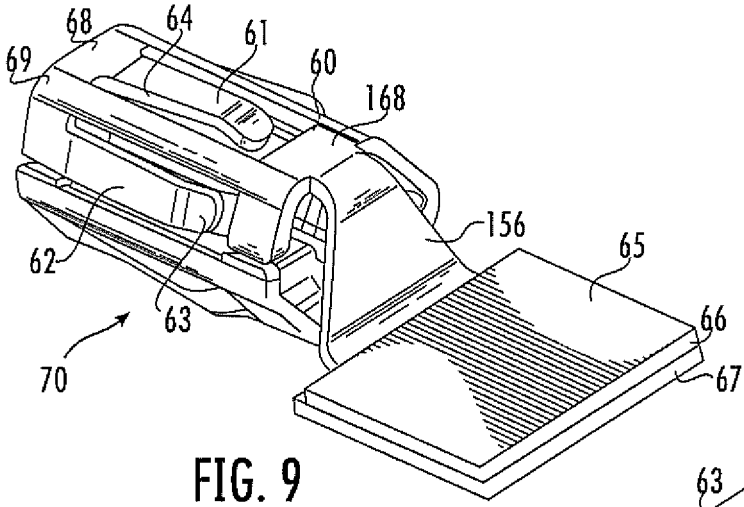
FIG. 9 is an isometric view of an alternative embodiment of the female connector without a plastic shroud.
Figure 10:
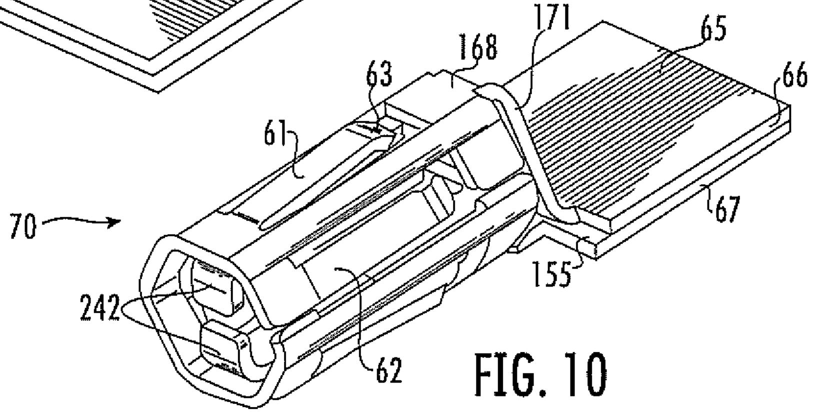
FIG. 10 is an isometric view of an alternative embodiment of the female connector, rotated approximately 90° from FIG. 9.

FIGS. 9-10 show an alternative embodiment of the present invention a high-power, spring-actuated electrical connector. The female connector 70 includes a contact element having a contact element 60 base having six sides 68 and bent portions 69. The contact element 60 base is substantially hexagonal 68, 69, 168. The contact element 60 has a six contact beams 61. Each contact beam 61 has a substantially planar surface 62 terminating in a bent-termination portion 63. The thickness 64 and surface area of the planar surface 62 dictate the current carrying load of each contact beam 61. The contact beams 61 form a large obtuse angle with the base 68, 69, 168. In this embodiment, the contact beams 61 have been reversed relative to the spade elements 66, 67. In this embodiment, there is flat portion 68 of the base that connects to the contact beams 61 and an additional flat portion 168 of the base near the bent-termination portion 63. The bent-termination portion 63 extends past the additional flat portion 168.

The contact element 60 is an integral piece. The contact element 60 is made out of conductive metal, such as copper alloys C151 or C110. It is formed, bend, and folded into the correct shape. The contact element 10 has two planar spade elements 66, 67. The planar spade elements 66, 67 have a thickness 616, 67. The planar spade elements 66, 67 have a planar surface 65, 155. The planar spade elements 66 transitions 156 from the hexagonal base 68, 69, 168. The transition 156 has a thickness 171.

Figure 11:
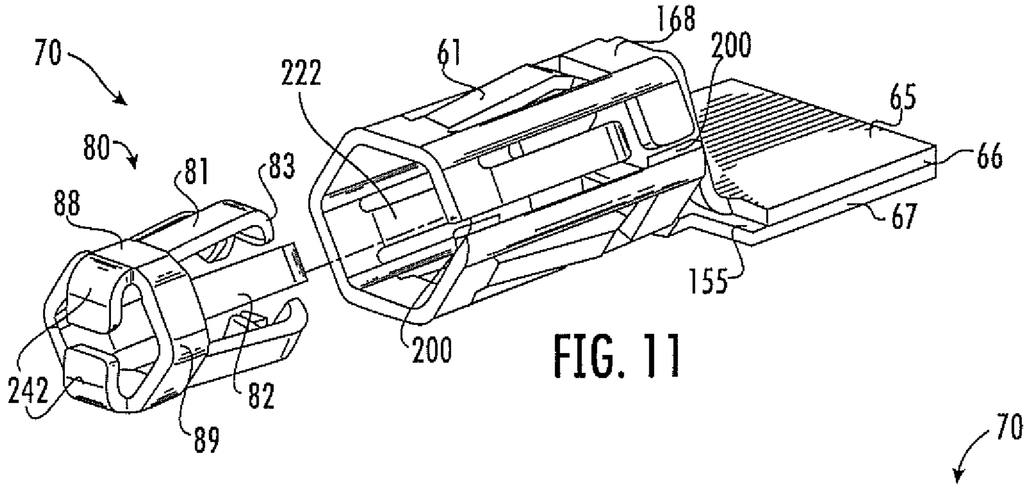
FIG. 11 is an exploded isometric of an alternative embodiment of the female connector.

FIG. 11 further illustrates the female connector 70 of the present invention by showing the spring actuator 80 that is inside the contact element 60. Still visible in the contact element 60 are the contact beams 61, the hexagonal base 168, and the planar spade elements 65, 66, 67, 155. The gap 200 caused by forming the contact element 60 out of a single piece of copper is also visible in this orientation. The spring actuator 80 has a plurality of spring arms 81. The spring arms 81 have a substantially planar surface 82 and a bent-termination portion 83. The spring actuator 80 base is substantially hexagonal with six flat sides 88 and five bent portions 89. The spring actuator 80 is fabricated from spring steel. The spring arms 81 of the spring actuator 80 form a large obtuse angle with the spring actuator 80 base 88, 89.

The spring actuator 80 fits inside the contact element 60. The spring actuator 80 spring arms 81 contact the inside planar surface 222 of the contact element 60 contact beams 61. The bent-termination portion 63 of the contact element 60 allows the female connector 70 to be compressed as it is inserted into a connector block. The spring actuator 80 spring arms 81 will provide a consistent retention force against the inside surface 222 of the contact element 60 contact beams 61.

Figure 12:
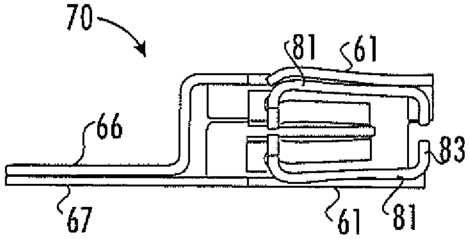
FIG. 12 is a lateral cut-away view of an alternative embodiment of the female connector.
Figure 13:
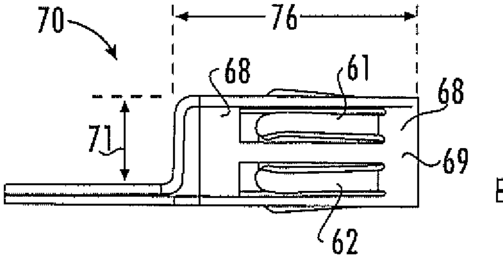
FIG. 13 is a lateral view of an alternative embodiment of the female connector.

FIGS. 12-13 show a lateral cutaway (FIG. 8) and a lateral view (FIG. 9). The relation of the planar spade elements 66, 67 to the contact beams 61 is illustrated. The spring actuator 80 spring arms 81 and bent-termination 83 are shown in the cutaway. The relation of the six sides 68 of the hexagonal base 68, 69, 168 to the planar surface 62 of the contact beams 61 is shown. The female connector 70 has, generally, a length 76 and a width 71. A ratio of length 76 to width 71 is the aspect ratio of the female connector 70.

Figure 14:
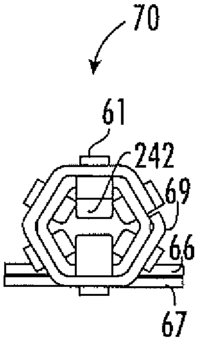
FIG. 14 is an end view of an alternative embodiment of the female connector.

FIG. 14 shows an end-view of the spring actuator 80 inside the contact element 60. The bottom bent-termination 242 of the spring actuator 80 is visible.

Figure 1:
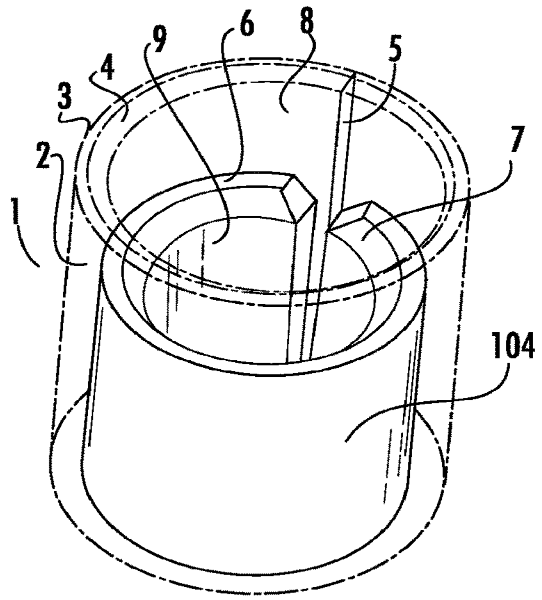
FIG. 1 is an isometric view of a male terminal showing the non-conductive plastic shroud and metallic tubular member.
Figure 2:
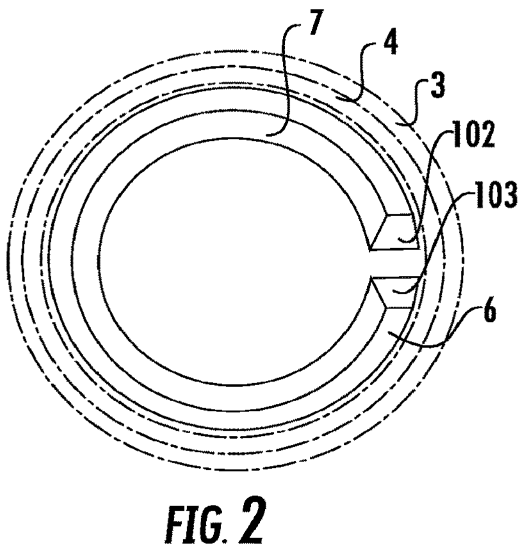
FIG. 2 is a top view of a male terminal.

FIGS. 1-2 show the male terminal portion 1 of the present invention. The male terminal portion 1 of the present invention consists of a cylindrical plastic shroud 5; and a cylindrical stamped metallic terminal ("male terminal") 6, 7, 8, 9, 102, 103, 104. The plastic shroud 5 is a cylinder with an outer surface 2, an inner surface 8, an upper edge 3 and a taper 4 connecting the inner cylindrical surface 8 and the upper edge 3. The plastic shroud 5 is made from high-temperature polymers, such as high-temperature polyamide (e.g., nylon 66). The male terminal has an outer cylindrical surface 104, an inner cylindrical surface 9, an upper edge 6, a taper 7 connecting the upper edge 6 and the inner cylindrical surface 9, and two fillets 102, 103.

The female connector 20, 70 fits inside the male terminal portion 1. At elevated temperatures, the contact element 10, 60, and the spring actuator 30, 80, will tend to expand outwards due to metal memory and thermal expansion. This will increase the outward directed spring force exerted by the spring arms 31, 81 on the contact beams 11, 61. In turn, this will increase the contact force between the contact beams 11, 61 and the inner cylindrical surface 9 of the male terminal portion 1. As a result, the increased temperatures present in a motor vehicle engine compartment will increase, rather than decrease, the contact force of the connector.

FIGS. 21-24 illustrate the interaction of the female connector 70 and the male terminal 1. The inner diameter 90 of the inner cylindrical surface 9 of the male terminal 1 contacts the contact element 60. The spring actuator 80 exerts outward force on the contact element 60 pushing the contact beams 61 of the contact element into the connector. The bent-termination portion 63 of the contact beams 61 are the part that contact the inner diameter 90. The upper edge 6 and taper 7, and fillets are oriented nearer the bent-termination portion 63 of the beams 61, in this embodiment.

Figure 15:
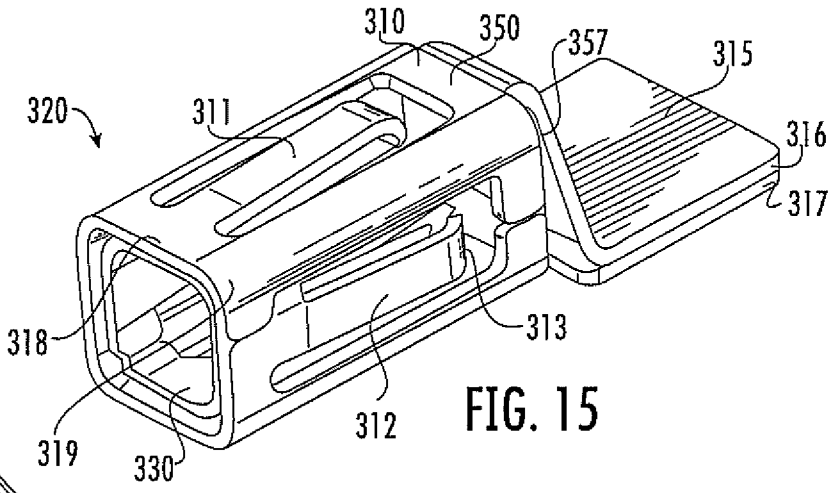
FIG. 15 is an isometric view of an alternative embodiment of the female connector.

FIG. 15 shows another alternative embodiment of the first female connector 320 of the present invention, a high-power, spring-actuated electrical connector. The female connector 320 includes a contact element 310 base 350 having four sides 318 and four bent portions 319. The cross-section of the contact element 310 is substantially a square or rounded square with rectangular planar surfaces: the four side walls 318, the four rounded portions 319 extending between adjacent side walls 318, and the base 350. The contact element 310 has four contact beams 311. Each contact beam 311 has a substantially planar surface 312 terminating in a bent-termination portion 313. The contact beams 311 form extend at an angle to the base 350 and the side walls 318, and, as a result, the rounded termination end 313 is external to the side wall 318.

The contact element 310 is an integral piece. The contact element 310 is fabricated from a conductive metal, such as copper alloys C151 or C110. It is formed, bent, pressed, and/or folded into the correct shape. The contact element 310 has two planar spade elements 316, 317. The planar spade elements 316, 317 have a planar surface 315. The planar spade elements 316, 317 transition from the base 350 and have a thickness 357. A spring actuator 330, 530, 630 as shown in FIG. 15, is interior to the contact element 310 within an internal receiver formed by the side walls 318 of the contact element 310, that extends from an open first end to a second, closed end at the base 350 of the first connector 320.

Figure 16:
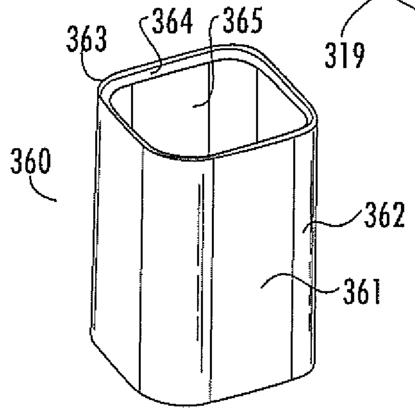
FIG. 16 is an isometric view of an alternative embodiment of the second connector.
Figure 17:
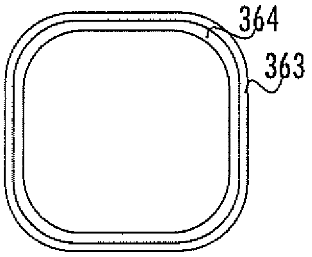
FIG. 17 is a top view of the alternative embodiment of the second connector and insulating shroud of FIG. 16.

FIGS. 16-17 show an alternative embodiment of the male terminal/connector 360 that mates with the first connector 320, shown in FIGS. 15 and 25-31, with a square cross-sectional base. In these drawings, the plastic shroud of the male terminal (or second connector 360) is omitted for clarity. The male terminal 360 has an outer surface 362, 361, an inner surface 365, an upper edge 363, and a taper 364 that connects the upper edge 363 to the inner surface 365. The female connector 320 fits inside the male terminal 360, thus the second connector 360 is cooperatively dimensioned to receive the female connector 320. The second connector 360, perhaps having differing overall dimensions, may be used with embodiments of the first connector 320, 520, 620 shown in FIGS. 15 and 25-31.

Figure 18:
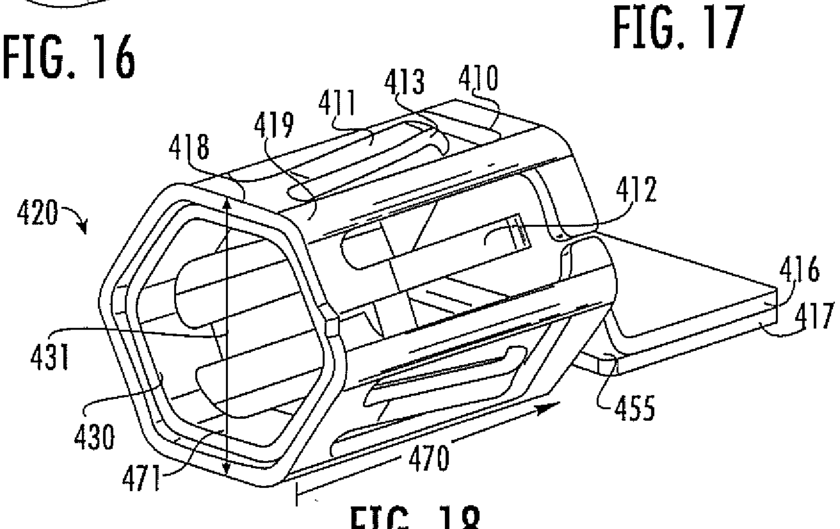
FIG. 18 is an isometric view of an alternative embodiment of the female connector.

FIG. 18 is another embodiment of the female connector 420 of the present invention, a high-power, spring-actuated electrical connector, with is similar to that shown in FIGS. 9-14, except with a different aspect ratio. The female connector 420 includes a contact element having a contact element 410 base having six sides 418 and six bent portions 419. The cross-section of the contact element 410 base is substantially hexagonal with rectangular planar surfaces 418, 419. The contact element 410 has a six contact beams 411. Each contact beam 411 has a substantially planar surface 412 terminating in a bent-termination portion 413. The contact beams 411 form a large obtuse angle with the base 418.

The contact element 410 is an integral piece. The contact element 410 is fabricated from a conductive metal, such as copper alloys C151 or C110. It is formed, bend, pressed, and/or folded into the correct shape. The contact element 410 has two planar spade elements 416, 417. The planar spade elements 416, 417 have a thickness 416, 417. The planar spade elements 416, 417 have a planar surface 455. A spring actuator 430, with spring arms 431 is interior to the contact element 410. The female connector 420 has, generally, a length 470 and a width 471. A ratio of length 470 to width 471 is the aspect ratio of the female connector 420.

Figure 19:
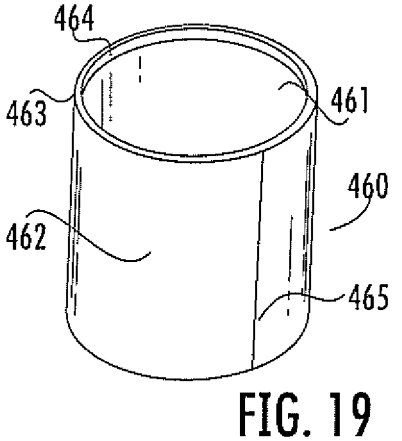
FIG. 19 is an isometric view of an alternative embodiment of the insulating shroud used with the female connector.
Figure 20:
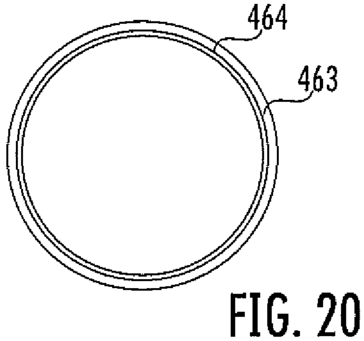
FIG. 20 is a top view of an alternative embodiment of the insulating shroud.
Figure 21:
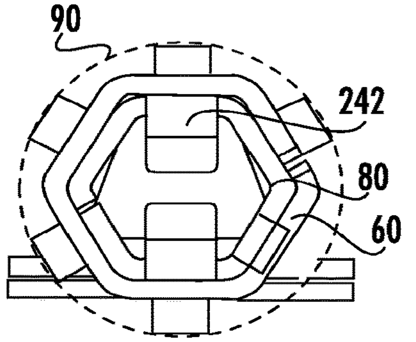
FIG. 21 is an end view of the female connector with an envelope of the non-conductive plastic shroud drawn as a dotted line.
Figure 22:
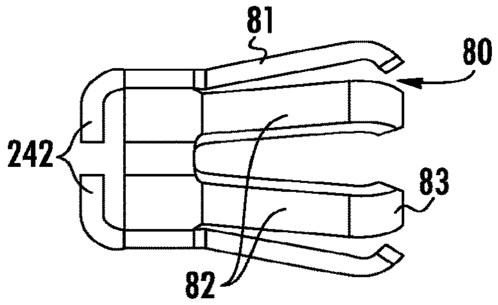
FIG. 22 is an isolated lateral view of the spring actuator of the female connector.
Figure 23:
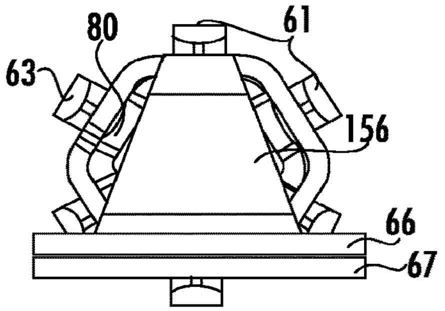
FIG. 23 is a reverse end view of the female connector.
Figure 24:
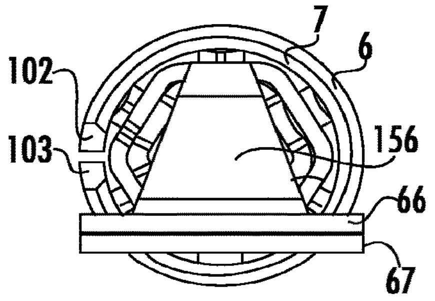
FIG. 24 is a reverse end view of the female connector, with the insulating shroud in situ.
Figure 26:
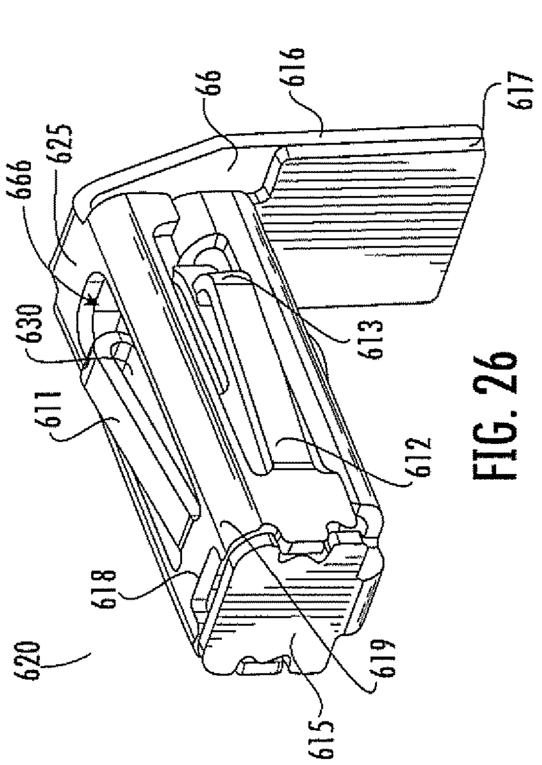
FIG. 26 is an isometric view of an alternative embodiment of the female connector.
Figure 28:
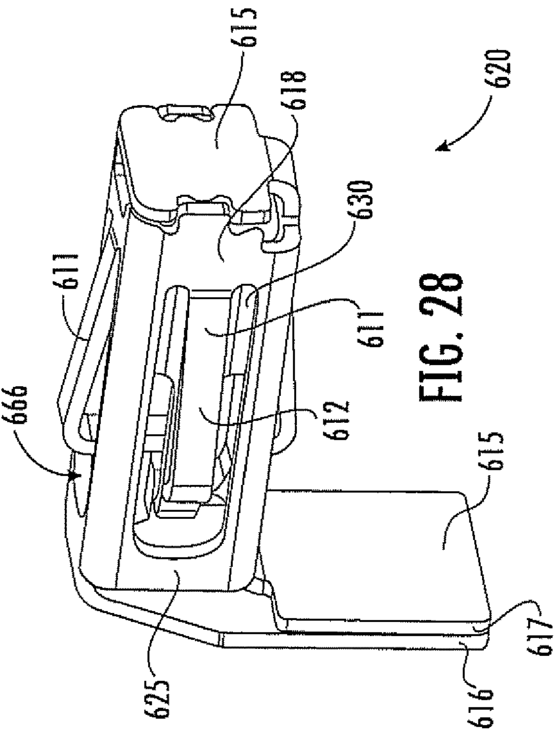
FIG. 28 is a rotated isometric view of FIG. 26.
Figure 25:
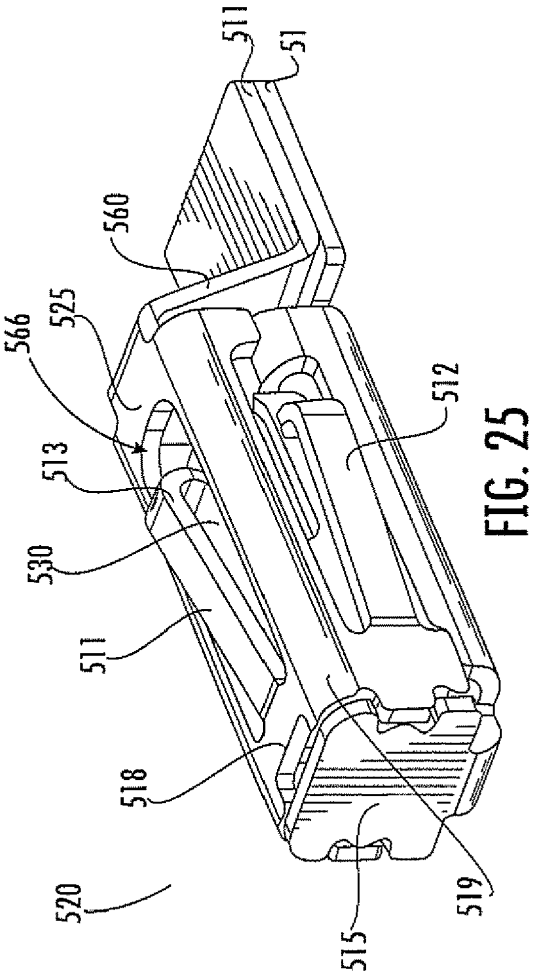
FIG. 25 is an isometric view of an alternative embodiment of the female connector.
Figure 27:
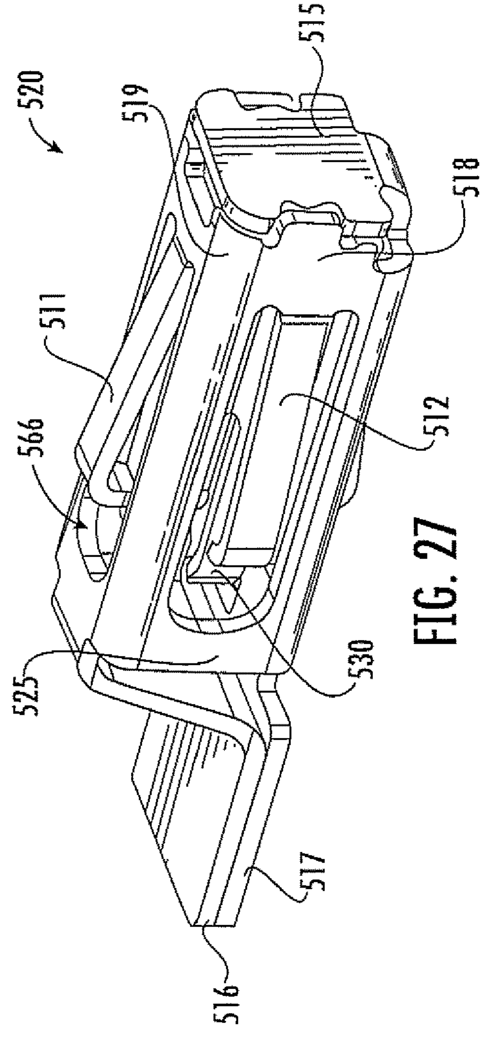
FIG. 27 is a rotated isometric view of FIG. 25.

FIGS. 19-20 show an alternative embodiment of the male terminal 460 that would mate with a female connector 420 with a hexagonal cross-sectional base. In these drawings, the plastic shroud of the male terminal portion is omitted for clarity. The male terminal 460 has an outer surface 462, an inner surface 461, an upper edge 463, and a taper 464 that connects the upper edge 463 to the inner surface 461. The female connector 420 fits inside the male terminal 460.

FIGS. 25-28 show two additional alternative embodiments of a first, female connector 520, 620 with a square or substantially square cross-section. As shown in these figures, the embodiments have many elements in common: four side walls 518, 525, 618, 625 with an aperture 566, 666; four bent or rounded portions 519, 619 extending between a pair of adjacent side walls 518, 525, 618, 625; contact beams 511, 611 that have planar surfaces 512, 612 a curvilinear, bent-termination portion 513, 613 adjacent to a free end 568; a bottom plate 515; and a spring actuator 530, 630 positioned within the first connector 520, 620. These two alternative embodiments also have planar spade elements: 560, 515, 516, 517; and 660, 615, 616, 617. In one embodiment 520, the spade element 560, 515, 516, 517 is parallel with two of the four sides 518, 525. In the other embodiment 620, the spade element 660, 615, 616, 617 is orthogonal to all four sides 618, 625.

Figure 29:
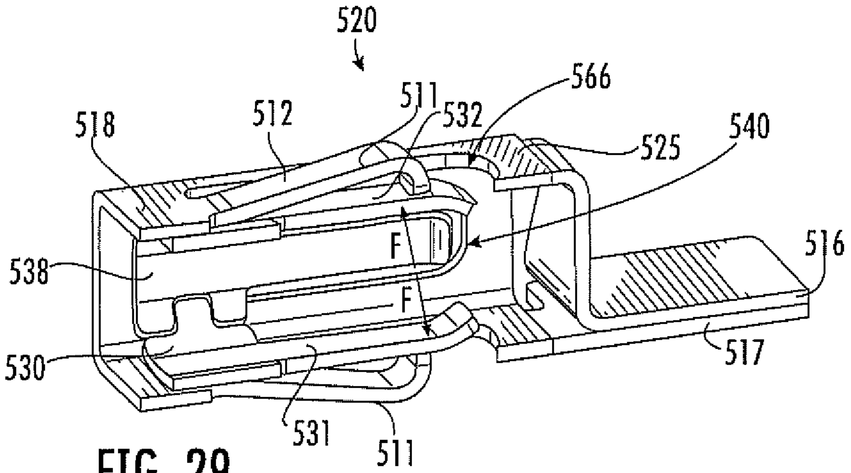
FIG. 29 is a cut-away lateral view of an alternative embodiment of the female connector.
Figure 30:
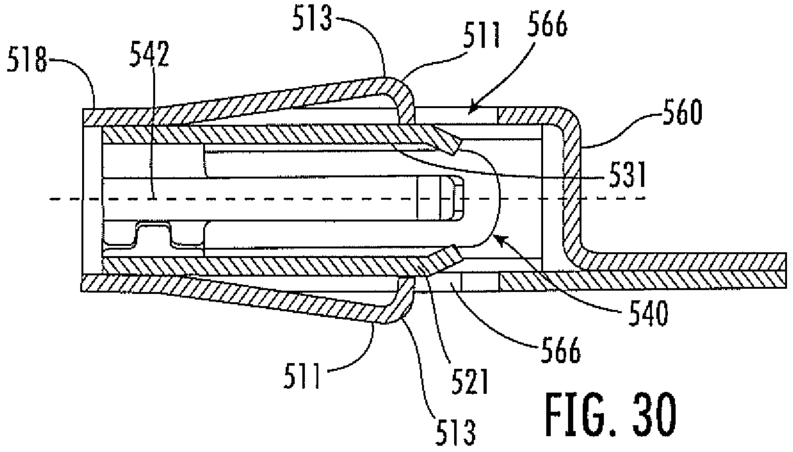
FIG. 30 is a cut-away lateral view of an alternative embodiment of the female connector.
Figure 31:
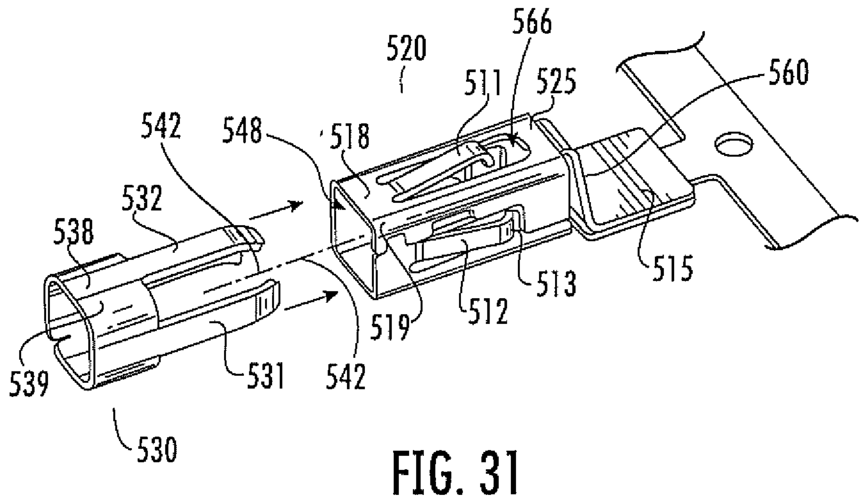
FIG. 31 is a lateral exploded view of the contact element and spring actuator.

FIGS. 29-30 are an isometric cutaway and a lateral cutaway of the first, female connector 520 with a square or substantially square cross-section, respectively. FIG. 31 is an isometric exploded view of the female connector 520, previously illustrated in FIGS. 25-28, with a square or substantially square cross-section. The spring actuator 530 sits inside an internal receiver 540 formed therein have a centerline 542 (see FIGS. 30 and 31) passing substantially through the center(s) thereof. The spring actuator 530 has spring arms 531 and a base portion 538 made of spring steel and/or stainless steel. The spring arms 531 have a flat planar surface 532 which exert outward force on the contact beams 511. As shown by the arrows in FIG. 29, a biasing force F exerted by the spring arms 531 is directed outward and away from the centerline 542 of the receiver 540 and a first connector 520. The contact beams 511 have a flat planar surface 512 and a curvilinear shoulder or bent portion 513 adjacent to the free end 568. The free end 568 of the contact beam 511 contacts the flat planar surface 532 of the corresponding spring arm 531. This allows the spring arms 531 to be coplanar with the base portion 538 of the spring actuator 530 so that they do not become overstressed during the fabrication process.

The alternator terminal assembly 700 mates with the male terminal 703, as shown in FIG. 33-36. The male terminal 703 has a metallic, square tube 777 and a high temperature, non-conductive polymer shroud 711 with flange 709. The metallic, square tube 777 is electrically integral with the alternator busbar 708. The metallic square tube 777 is commonly made out of copper C110 or C151. The metallic square tube 777 has an outer surface composed of flat segments 769 and curved segments 768, an inner contact surface 710, a busbar 708, and an upper edge 770, distal from the busbar 708. The plastic shroud 711 has an inner surface 750, an outer surface 711, a flange 709, an upper edge 757 distal from the flange 709, and a mating protrusion 755. The mating protrusion 755 can be used to insure positive engagement between the female connector and the male terminal.

Figure 37:
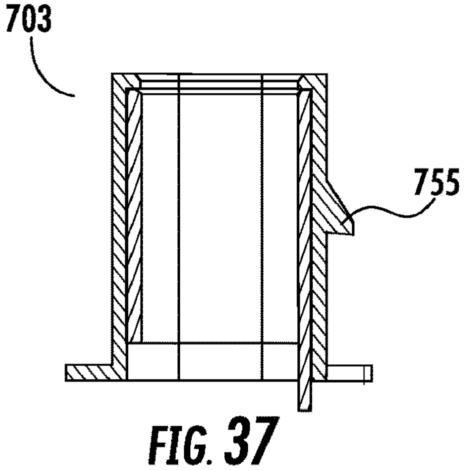
FIG. 37 is a side view of the male terminal.
Figure 38:
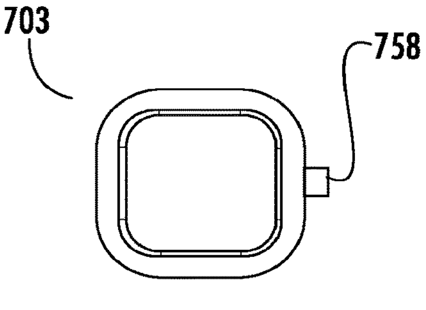
FIG. 38 is an end view of the male connector.

FIGS. 37-38 show two angles of the male terminal 703 with a mating protrusion 755 highlighted.

Figures 32, 33:
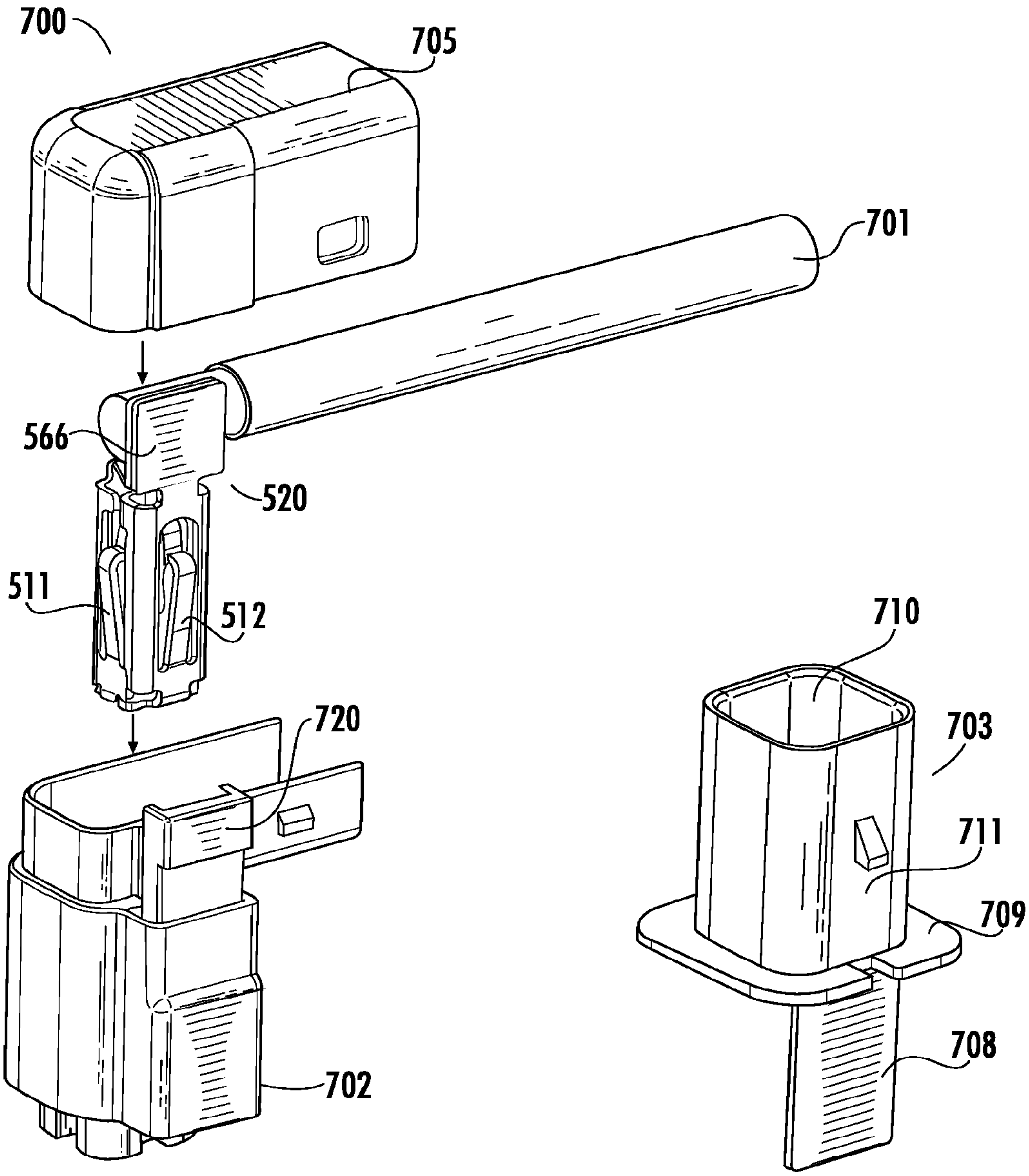
FIG. 32 is an exploded view of the female connector with an alternator connector and cap.
FIG. 33 is an isometric view of a male terminal for an alternator.
Figure 34:
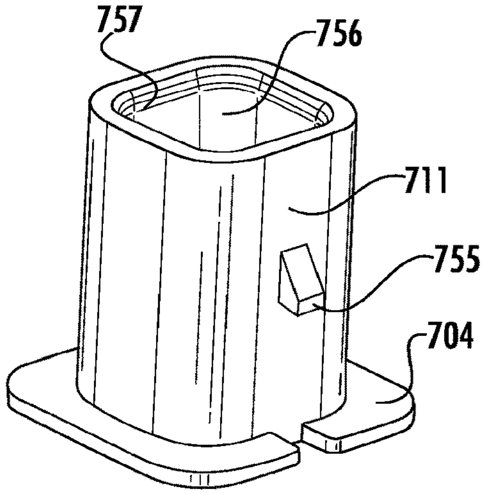
FIG. 34 is an isometric view of the plastic shroud of a male terminal for an alternator.
Figure 35:
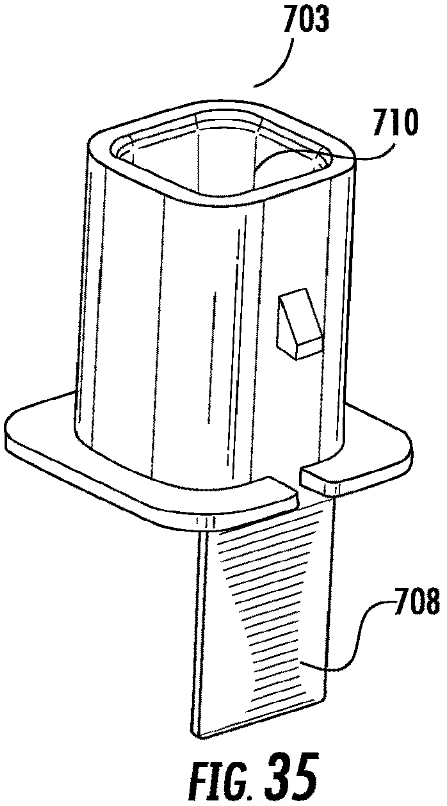
FIG. 35 is an isometric view of the male terminal.
Figure 36:
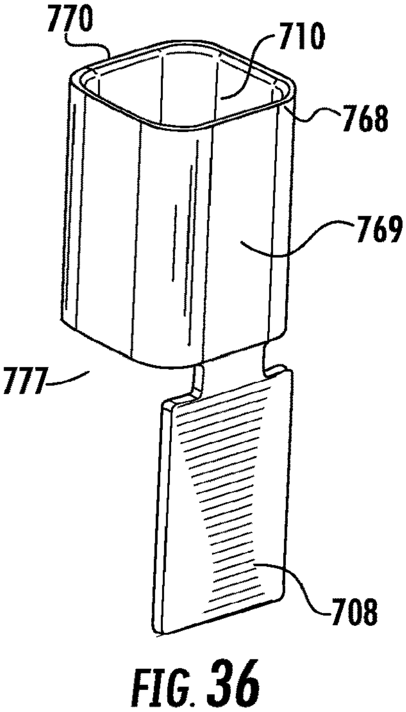
FIG. 36 is an isometric view of the metallic tubular member.

FIG. 32 shows the female connector 520 assembled into an alternator terminal assembly 700. A spade surface 515 (the reverse spade surface 566 is visible in FIG. 32) is ultrasonically welded or crimped to the wire 701. A cap 705 fabricated from high temperature polymers, such as high temperature polyamides, covers spade 566 of the female connector 520 and the wire weld. The rest of the female connector 520 fits into an alternator connector 702.

Figure 39:
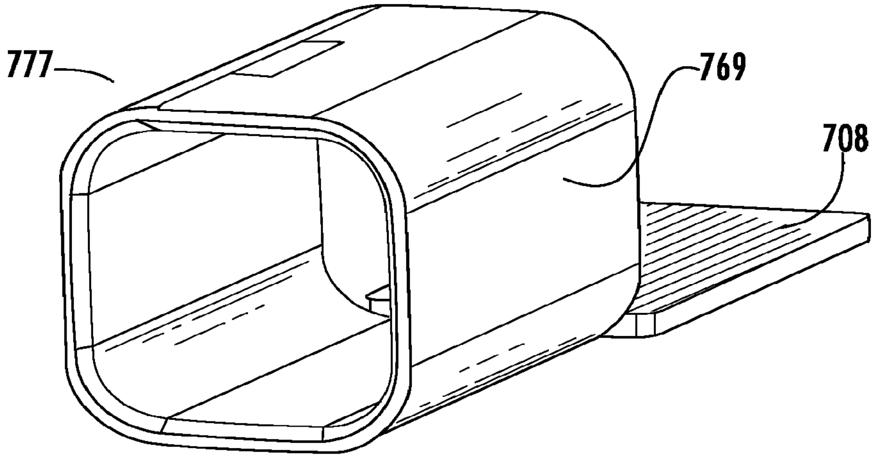
FIG. 39 is an isometric view of the male terminal metallic tubular member with an integral straight busbar.
Figure 40:
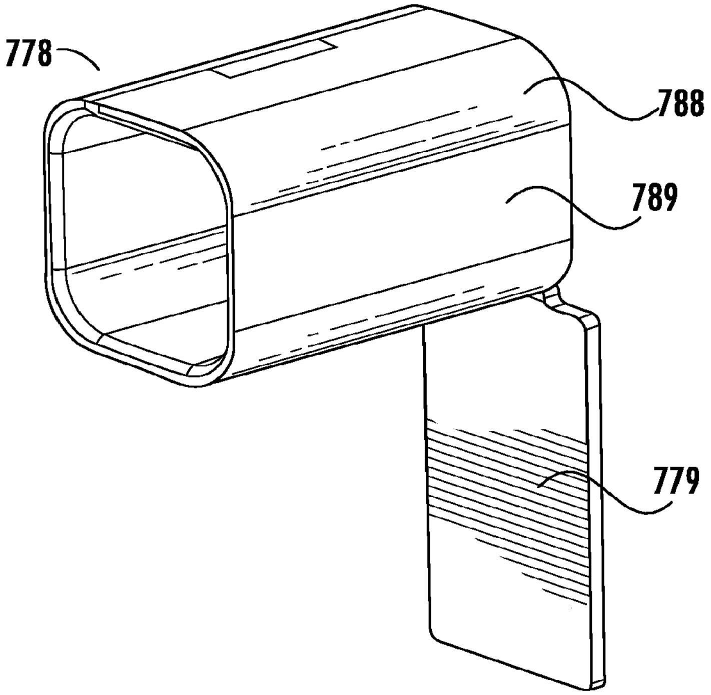
FIG. 40 is an isometric view of the male terminal metallic tubular member with an alternative embodiment and orientation of the integral busbar.

FIG. 39-40 show two different embodiments of the metallic, square tube 778, 777. In one, the busbar 708 is parallel to the metallic tube 777. The busbar 708 is integral with the surface of the metallic tube 769. In the other embodiment, the busbar 779 is orthogonal to the surfaces 789, 788 of the metallic tube 778.

Figure 41:
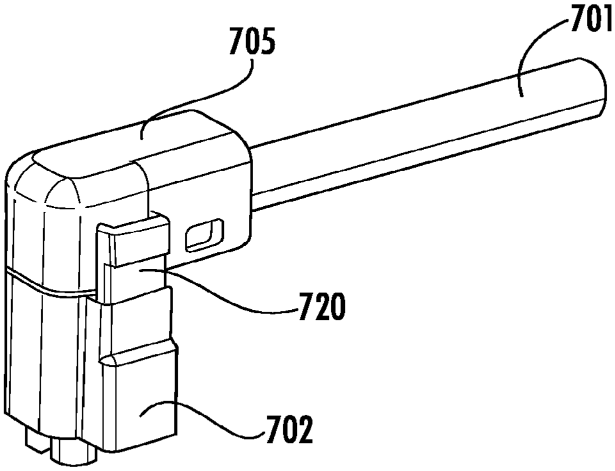
FIG. 41 is an isometric view of the female connector implemented on an alternator connector.
Figure 42:
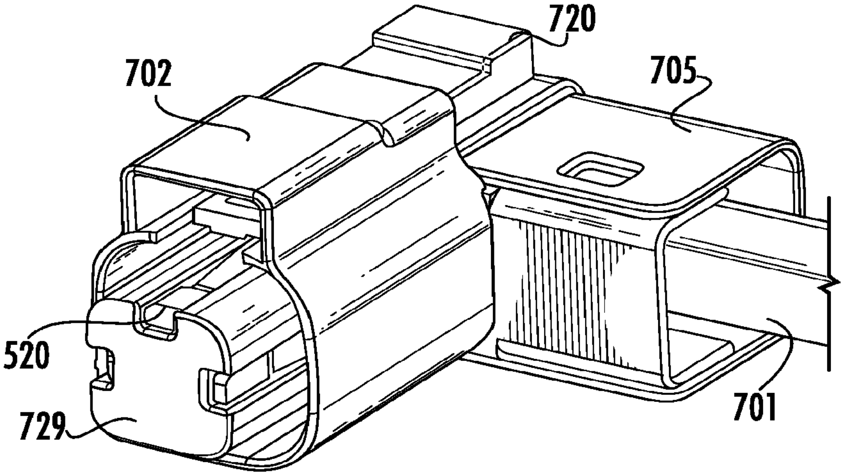
FIG. 42 is an alternative isometric view of the female connector implemented on an alternator connector.

FIGS. 41-42 show the female connector 520 in situ in an alternator terminal assembly 700. The cap 705 segment is joined to the alternator connector segment 702. The alternator connector segment has a plastic shroud 729 to prevent premature electrical contact. The beams 511 extend pass the plastic shroud 729, creating an electrical connection when mated with the male terminal 703. The alternator terminal assembly 700 has a connector position assurance indicator 720.

Figure 44:
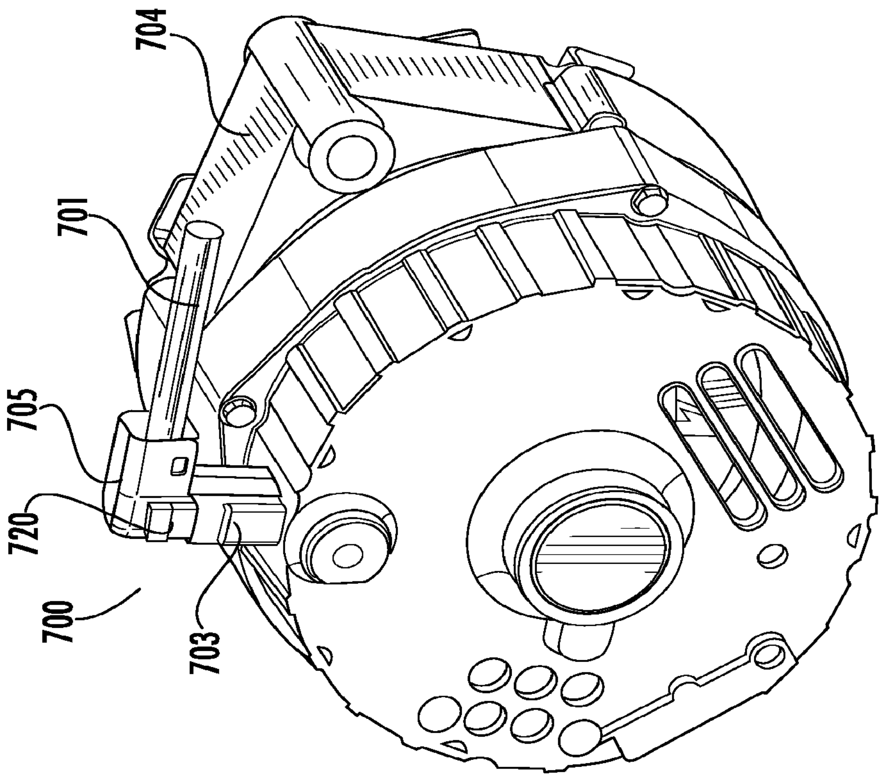
FIG. 44 is an isometric view of the present invention implemented on an alternator connector, in situ on an alternator.
Figure 43:
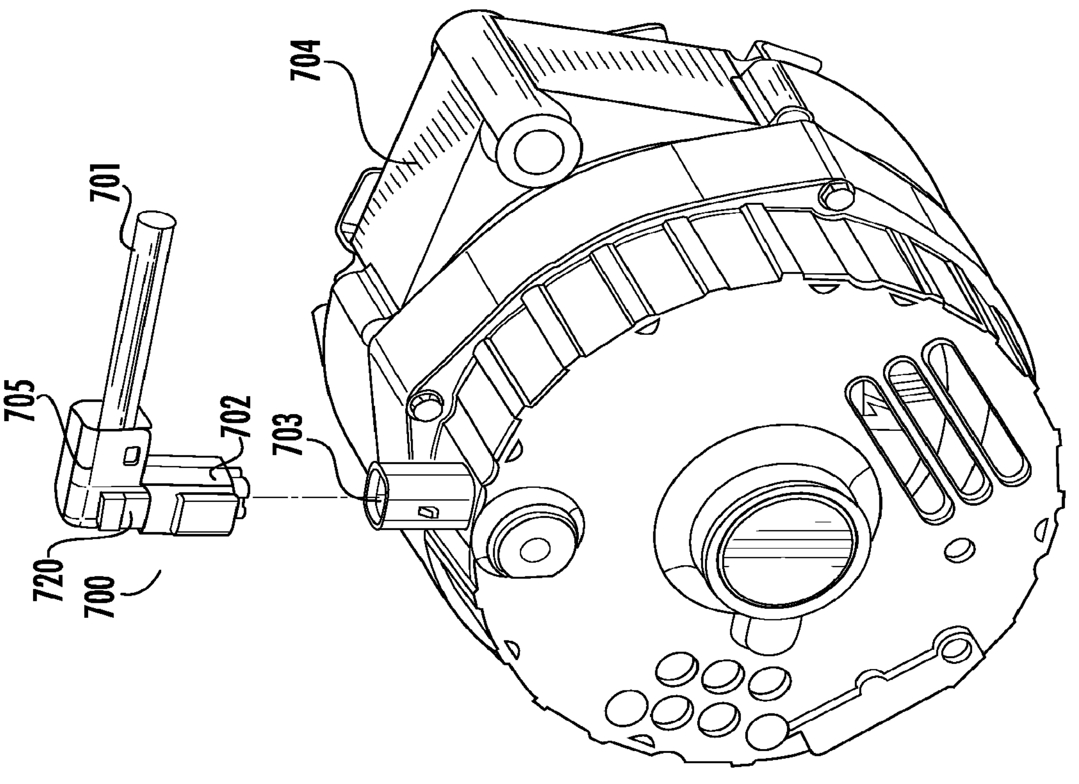
FIG. 43 is an isometric view of the present invention implemented on an alternator connector, with the alternator.

FIGS. 43-44 show the alternator terminal assembly 700 in situ with an alternator 704. The male terminal 703 is integral to the alternator 704. The alternator terminal assembly 700 with the female connector 520 mates with the male terminal 703 as shown in FIG. 42. The connector position assurance indicator 720 shows whether the connector is fully engaged and locked.

The invention claimed is:

1. A connector assembly comprising:

a connector comprising at least one contact beam and defining a receiver;

a spring member comprising a spring arm; and wherein, when the spring member is inserted into the receiver of the connector, the spring arm is configured to provide an outwardly directed biasing force on the contact beam.

2. The connector assembly of claim 1, wherein the connector is formed from a first material and the spring member is formed from a second material.

3. The connector assembly of claim 1, wherein a residual material memory of the spring member increases the biasing force on the contact beam during operation of the connector assembly.

4. The connector assembly of claim 1, wherein the contact beam comprises a first contact beam that is positioned on a first side of the receiver and a second contact beam that is positioned on a second side of the receiver, wherein the second side is opposite to the first side of the receiver.

5. The connector assembly of claim 4, wherein the contact beam comprises a third contact beam that is positioned on a third side of the receiver and a fourth contact beam that is positioned on a fourth side of the receiver, wherein the third side and the fourth side are substantially perpendicular to the first side of the receiver.

6. The connector assembly of claim 1, wherein the contact beam includes a free-end that resides against an outer surface of the spring arm, and wherein at least a portion of the biasing force exerted by the spring arm is applied to said free-end of the contact beam.

7. The connector assembly of claim 1, further comprising a non-conductive shroud that surrounds a portion of the connector.

8. The connector assembly of claim 7, wherein the non-conductive shroud includes a connector position assurance indicator.

9. The connector assembly of claim 1, wherein the connector further comprises a connection plate, a side wall, and a rear wall extending between the connection plate and the side wall.

10. The connector assembly of claim 9, wherein the side wall defines an opening, and the at least one contact beam extends across a portion of the opening.

11. The connector assembly of claim 9, wherein the connection plate extends perpendicular to the side wall of the connector.

12. The connector assembly of claim 9, wherein the connection plate extends parallel to the side wall of the connector.

13. The connector assembly of claim 9, further comprising a wire coupled to the connection plate.

14. The connector assembly of claim 13, wherein the wire extends in a direction substantially parallel to a surface of the connection plate.

15. The connector assembly of claim 13, wherein the wire extends in a direction substantially orthogonal to a surface of the connection plate.

16. The connector assembly of claim 1, wherein the connector includes an end wall being movable between an open position that allows the receiver to receive the spring member, and a closed position that secures the spring member in the receiver.

17. The connector assembly of claim 1, further comprising a non-conductive shroud that surrounds a portion of the connector while exposing a portion of the at least one contact beam whereby the non-conductive shroud does not interfere with a biasing force provided by the spring arm on the contact beam.

18. The connector assembly of claim 17, further comprising a second connector, and wherein a receptacle of the second connector is dimensioned to receive a portion of the non-conductive shroud and the connector.

19. The connector assembly of claim 1, wherein a gap is formed between a portion of an outer surface of the spring arm and a portion of an inner surface of the contact beam.

* * * * *